United States Patent
Yoon

(10) Patent No.: US 8,200,455 B2
(45) Date of Patent: Jun. 12, 2012

(54) DIAGNOSIS FUNCTION DETECTION APPARATUS OF VEHICLE AND DETECTION METHOD THEREOF

(75) Inventor: Sang Il Yoon, Suwon (KR)

(73) Assignee: Hyundai Motor Company, Seoul (KR)

( * ) Notice: Subject to any disclaimer, the term of this patent is extended or adjusted under 35 U.S.C. 154(b) by 414 days.

(21) Appl. No.: 12/506,183

(22) Filed: Jul. 20, 2009

(65) Prior Publication Data

US 2010/0131179 A1 May 27, 2010

(30) Foreign Application Priority Data

Nov. 24, 2008 (KR) .......................... 10-2008-0116847

(51) Int. Cl.
G06F 11/30 (2006.01)
(52) U.S. Cl. ........... 702/182; 324/503; 701/33; 702/116
(58) Field of Classification Search ............... 702/35, 702/116, 156, 176, 182, 183, 184, 185; 701/29, 701/33; 324/399, 503; 73/33.5, 114.61; 60/274, 276
See application file for complete search history.

(56) References Cited

U.S. PATENT DOCUMENTS

| 6,701,232 B2 * | 3/2004 | Yamaki ........................... 701/33 |
| 7,246,024 B2 * | 7/2007 | Muramatsu et al. .......... 702/116 |
| 2007/0095131 A1 * | 5/2007 | Takayama ....................... 73/116 |

* cited by examiner

Primary Examiner — John H Le
(74) Attorney, Agent, or Firm — Morgan, Lewis & Bockius LLP

(57) ABSTRACT

A diagnosis function detecting apparatus of a vehicle is configured to detect a diagnosis function for diagnosing a malfunction of the vehicle, and a detecting method thereof. A method for detecting a malfunction diagnosis function of a vehicle may include detecting the operation condition of the engine of a vehicle, determining whether the accumulated operation time of the engine or the accumulated fuel consumption amount exceeds a predetermined value, determining whether the malfunction diagnosis function is in a normal condition when the accumulated operation time or the accumulated fuel consumption amount exceeds the predetermined value, and restricting the output torque of the engine or lighting a warning lamp when the malfunction diagnosis function is in an abnormal condition, or sustaining the normal driving condition when the malfunction diagnosis function is in a normal condition.

2 Claims, 2 Drawing Sheets

DIAGNOSIS FUNCTION DETECTION APPARATUS OF VEHICLE AND DETECTION METHOD THEREOF

CROSS-REFERENCE TO RELATED APPLICATION

The present application claims priority of Korean Patent Application Number 10-2008-0116847 filed Nov. 24, 2008, the entire contents of which application is incorporated herein for all purposes by this reference.

BACKGROUND OF THE INVENTION

1. Field of the Invention

The present invention relates to a diagnosis function detecting apparatus of a vehicle, and more particularly to a diagnosis function detecting apparatus that detects the diagnosis function for diagnosing malfunction of the vehicle, and a detecting method thereof.

2. Description of Related Art

In vehicles, NOx related malfunction diagnosis items (air flow sensor, EGR related items, etc.) are separately managed, when one of the above items malfunctions a malfunction code is stored, and if the stored value surpasses a predetermined threshold value, a warning lamp is lit and simultaneously output torque of an engine is restricted.

Then, the stored malfunction code cannot be erased for a predetermined time, desirably for 9600 hours.

The details thereof are as shown in the following Table 1.

TABLE 1

| | EURO4 threshold value | OBD threshold value | System operation | DTC management |
|---|---|---|---|---|
| NOx | 3.5 | 5.0 | Warning lamp lit | Erasable |
| | | 7.0 | Warning lamp lit, torque restriction | Erasable after 9600 hours |

However, there is a problem that the malfunction code is generated to be stored in a vehicle assembling process or in a control apparatus replacement process.

Accordingly, the EOL (end of line) value is set to be "0" (false) in a vehicle assembly plant so as to incapacitate the malfunction diagnosis function, and when the entire vehicle is completely assembled, the engine ID is input and the EOL value is set to be "1" so as to capacitate the malfunction diagnosis function.

However, when the vehicle is assembled in a condition in which the malfunction diagnosis function does not operate or when the assemblage is completed in a condition in which the engine ID is not input, the malfunction diagnosis function of the vehicle is not operated.

Also, if the engine ID is not input after the engine control unit (ECU) is replaced, there is a problem in that the malfunction diagnosis function is not executed in the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been made in an effort to provide a diagnosis function detecting apparatus of a vehicle and a detecting method thereof having advantages of detecting whether the malfunction diagnosis function is normally operated or not in a vehicle that is assembled or when the engine control unit thereof is replaced.

A diagnosis function detecting apparatus of a vehicle may include a starting detector that detects the starting of an engine, a fuel consumption amount detector that detects the fuel consumption amount (fuel injection amount), a controller that determines whether a malfunction diagnosis function is in a normal condition or not when the engine of the vehicle is operated, and a display portion that advises that the malfunction diagnosis function is in an abnormal condition corresponding to a control signal of the controller.

The controller may accumulate the operation time of the engine after the first starting thereof, and if the accumulated operation time exceeds a predetermined value, it may determine whether the malfunction diagnosis function is in a normal condition or not.

The controller may accumulate the fuel consumption amount (fuel injection amount) after the first starting of the vehicle, and if the accumulated fuel consumption amount exceeds a predetermined value, it may determine whether the malfunction diagnosis function is in a normal condition or not.

The controller makes a fuel injection amount low to restrict the output torque of the engine when the malfunction diagnosis function is in an abnormal condition.

The controller may calculate the accumulated operation time or the accumulated fuel consumption amount after starting a vehicle in which an engine control unit (ECU) thereof is exchanged, if the accumulated operation time or the accumulated fuel consumption amount exceeds a predetermined value, and may determine whether the malfunction diagnosis function is in an abnormal condition.

A method for detecting malfunction diagnosis function of a vehicle may include detecting the operation condition of the engine of the vehicle, determining whether the accumulated operation time of the engine or the accumulated fuel consumption amount exceeds a predetermined value, determining whether the malfunction diagnosis function is in a normal condition when the accumulated operation time or the accumulated fuel consumption amount exceeds the predetermined value, and restricting the output torque of the engine or lighting a warning lamp when the malfunction diagnosis function is in an abnormal condition, or sustaining the normal driving condition when the malfunction diagnosis function is in a normal condition.

The control for determining that the malfunction diagnosis function may be in a normal condition or not is executed one time for a vehicle that is just assembled or the engine control unit (ECU) thereof is exchanged.

The reference values for the accumulated operation time and the accumulated fuel consumption amount after the first starting of the engine may be maximum values in the operation time and the fuel consumption amount until the vehicle leaves the assembly plant.

Various aspects of the present invention prevent the malfunction diagnosis function from being abnormally operated in a vehicle in which the malfunction diagnosis function is not operated or the engine control unit is replaced by the above stated composition.

Further, the stability and the marketability of the vehicle are improved by normally diagnosing the malfunction of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
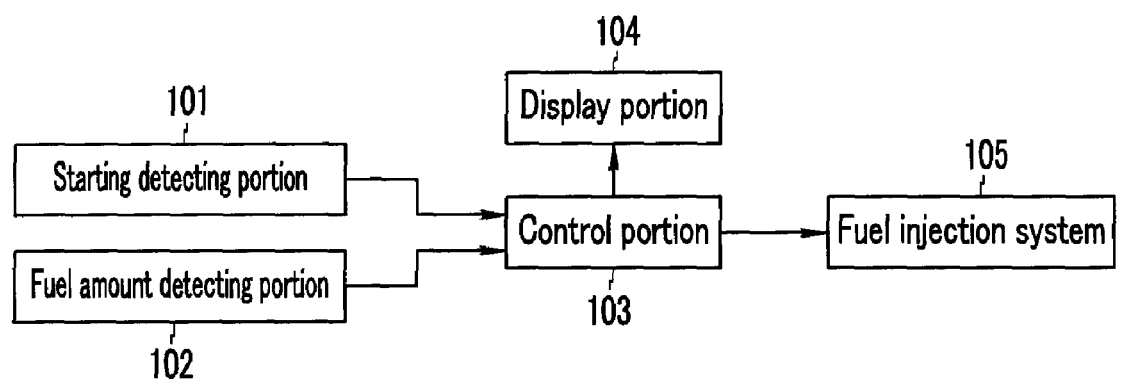
FIG. 1 is a schematic diagram of an exemplary diagnosis function detecting apparatus of a vehicle according to the present invention.

FIG. 1 is a schematic diagram of a diagnosis function detecting apparatus of a vehicle according to various embodiments of the present invention.

The present invention includes a starting detector 101, a fuel consumption amount detector 102, a controller 103, a display portion 104, and a fuel injection system 105.

The starting detector 101 detects the starting condition of an engine to offer the related data to the controller 103.

The fuel consumption amount detector 102 detects the fuel amount, that is, the injection amount that is being consumed by the running engine, to offer the related data to the controller 103.

The controller 103 accumulates the operation time of the engine of a vehicle that is just assembled or in which an engine control unit is just exchanged, then if the accumulated operation time excesses a predetermined value, it is determined whether the EOL value is set to be "1" or "0" so as to determine whether the malfunction diagnosis function is in a normal condition or in an abnormal condition, and if the malfunction diagnosis function is in the abnormal condition, a warning lamp is lit through the display portion 104 and the fuel injection system is controlled to reduce or to limit the output torque of the engine.

Also, the controller 103 accumulates the fuel consumption amount of the engine of a vehicle that is just assembled or in which an engine control unit is just exchanged, then if the accumulated fuel consumption amount excesses a predetermined value, it is determined whether the EOL value is set to be "1" or "0" so as to determine whether the malfunction diagnosis function is in a normal condition or in an abnormal condition, and if the malfunction diagnosis function is in the abnormal condition, a warning lamp is lit through the display portion 104 and the fuel injection system is controlled to reduce or to limit the output torque of the engine.

The display portion 104 lights the warning lamp that is disposed on a cluster according to the signal that is transferred from the controller 103 so as to warn a driver that the malfunction diagnosis function is in the abnormal condition.

The fuel injection system 105 makes the fuel injection amount lower than a predetermined value according to the control signal of the controller 103 in the abnormal condition of the malfunction diagnosis function to restrict the output torque of the engine.

In a vehicle having the functions as stated above according to the present invention, the operation for detecting the malfunction diagnosis function is explained as follows.

Figure 2:
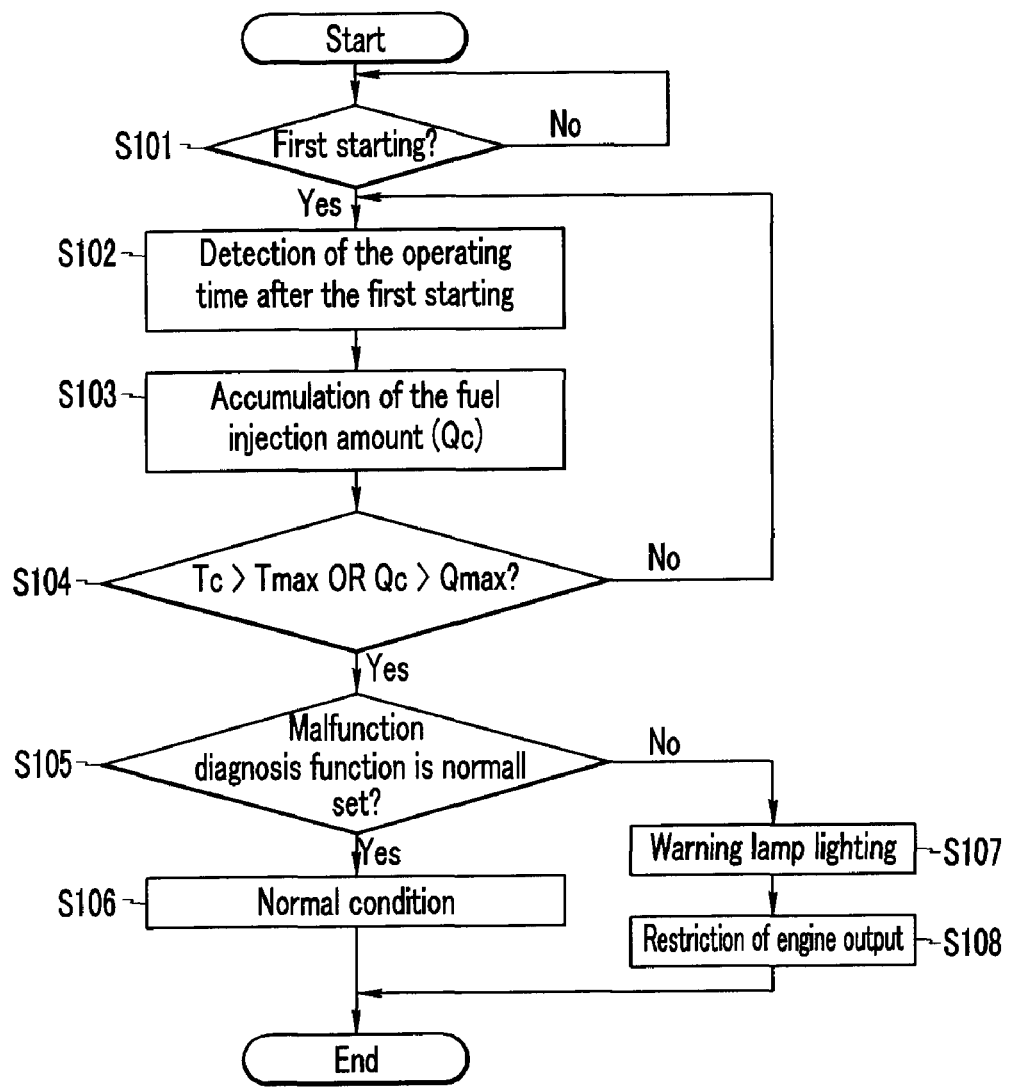
FIG. 2 is a flowchart for detecting an exemplary diagnosis function of a vehicle according to the present invention.

FIG. 2 is a flowchart for detecting a diagnosis function of a vehicle according to various embodiments of the present invention.

The controller 103 of the vehicle that is just assembled or the engine control apparatus thereof is exchanged analyzes the signal data of the starting detector 101 to determine whether the engine is in a running condition (S101).

If it is detected that the engine is first started by a starter in the step S101, the controller 103 uses the counter thereof to accumulate the operation time (Tc) (S102), detects the fuel consumption amount (fuel injection amount) through a fuel consumption amount detector 102, and analyzes the accumulated consumption quantity (Qc) (S103).

Then, it is determined whether the operation time (Tc) exceeds a predetermined maximum time (Tmax) or the accumulated consumption quantity (Qc) exceeds a maximum accumulated consumption quantity (Qmax) S104.

The maximum time (Tmax) is the maximum value of the operation time of the engine until the vehicle leaves the assembly plant thereof, and the maximum accumulated consumption quantity (Qmax) is the maximum value of the fuel consumption amount of the engine until the vehicle leaves the assembly plant thereof.

In the above step S104, if the operation time (Tc) exceeds the predetermined maximum time (Tmax) or the accumulated consumption quantity (Qc) exceeds the maximum accumulated consumption quantity (Qmax), it is determined that the EOL value is set to be "1" (true), that is, the malfunction diagnosis function is set to be in a normal condition (S105).

In the above S105, if the EOL value is set to be "1", that is, the malfunction diagnosis function is in a normal condition, the normal engine operation is sustained (S106).

However, in the step S105, if the EOL value is "0" (false), that is, the malfunction diagnosis function is set to be in an abnormal condition, the warning lamp of the display portion 104 is lit to notify the driver that the malfunction diagnosis function is in an abnormal condition S107.

Simultaneously, the controller 103 restricts the output torque of the engine through the fuel injection system 105 so as to induce the malfunction diagnosis function to be normally set (S108).

Determining whether the malfunction diagnosis function of the vehicle is in a normal condition or not is executed one time for a vehicle that has just been assembled or the engine control unit thereof is exchanged.

In various embodiments of the invention, when the malfunction diagnosis function is in an abnormal condition, the malfunction diagnosis function may not be operated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for a detecting malfunction diagnosis function of a vehicle, comprising:
   - detecting an operation condition of an engine of the vehicle;
   - determining whether an accumulated operation time of the engine or an accumulated fuel consumption amount exceeds a predetermined value;
   - determining whether the malfunction diagnosis function is in a normal condition when the accumulated operation time or the accumulated fuel consumption amount exceeds the predetermined value; and
   - restricting the output torque of the engine or lighting a warning lamp when the malfunction diagnosis function is in an abnormal condition, or sustaining the normal driving condition when the malfunction diagnosis function is in a normal condition;
   - wherein reference values for the accumulated operation time and the accumulated fuel consumption amount after the first starting of the engine are maximum values in the operation time and the fuel consumption amount until the vehicle leaves an assembly plant.

2. The method for detecting a malfunction diagnosis function of claim 1, wherein the control for determining that the malfunction diagnosis function is in a normal condition is executed one time for a vehicle that has just been assembled or the engine control unit (ECU) thereof is exchanged.

* * * * *